United States Patent [19]

Cook et al.

[11] Patent Number: 5,010,156

[45] Date of Patent: Apr. 23, 1991

[54] ORGANOSOLV LIGNIN-MODIFIED PHENOLIC RESINS AND METHOD FOR THEIR PREPARATION

[75] Inventors: Phillip M. Cook, Kingsport; Steven L. Hess, Mount Carmel, both of Tenn.

[73] Assignee: Eastman Kodak Company, Rochester, N.Y.

[21] Appl. No.: 491,802

[22] Filed: Mar. 12, 1990

Related U.S. Application Data

[63] Continuation-in-part of Ser. No. 197,783, May 23, 1988, abandoned.

[51] Int. Cl.$^5$ .................................... C08H 5/02
[52] U.S. Cl. ................................ 527/403; 530/501; 530/507
[58] Field of Search ............................... 527/403

[56] References Cited

U.S. PATENT DOCUMENTS

| | | | |
|---|---|---|---|
| 3,227,667 | 1/1966 | Moffitt et al. | 528/147 |
| 4,587,285 | 5/1986 | Ayla et al. | 524/78 |
| 4,594,130 | 1/1986 | Chang et al. | 162/77 |
| 4,746,401 | 5/1988 | Roberts et al. | 162/77 |

Primary Examiner—Earl Nielsen
Assistant Examiner—Frederick Krass
Attorney, Agent, or Firm—Mark A. Montgomery; Thomas R. Savitsky; William P. Heath, Jr.

[57] ABSTRACT

A lignin-modified phenol-formaldehyde resin for use as an adhesive for particulate wood products is disclosed which is prepared by reacting phenol and formaldehyde with an aqueous alkaline solution of an organosolv lignin. The organosolv lignin used in the formation of the resin is obtained from a pulping liquor prepared from particulate wood material from hardwood trees, aqueous polar organic solvent, and an acid catalyst. The resin allows for replacement of phenol or organosolv lignin at a level of up to 40% without detrimentally affecting its performance in terms of bonding strength or durability. The resin of the present invention is also superior to prior art lignin-modified resins in that it is low in sulfate, ash and sulfur residues, and thus will not give off distracting or harmful sulfur odors during resin preparation or hot-pressing of the adhesive and is unaffected and not solubilized by water.

14 Claims, No Drawings

ORGANOSOLV LIGNIN-MODIFIED PHENOLIC RESINS AND METHOD FOR THEIR PREPARATION

This application is a continuation-in-part of application Ser. No. 197,783 filed May 23, 1988 now abandoned.

FIELD OF THE INVENTION

The invention relates to a method of forming an organosolv lignin-phenol-formaldehyde resin for use particularly as an adhesive in the manufacture of flakeboards.

BACKGROUND OF THE INVENTION

It has long been known to employ phenol-formaldehyde resins as adhesives used in the manufacture of particulate wood products such as flakeboard and plywood. However, these adhesives are very expensive in proportion to the fibrous materials employed and this results in higher costs passed on to the consumer. This is particularly a problem with respect to phenol which is derived from petroleum, and thus is presently quite costly. In this regard, it has more recently been known to use certain lignins to replace some of the phenol in such resin adhesives in order to improve various characteristics in particulate wood products and to make these products less expensively.

At present, there are two main methods used in the development of lignins used to replace a portion of the phenol in resin adhesives for particulate wood panels and other products. One of these methods is the production of lignin sulfonates through the use of spent sulfite liquor from sulfite pulping. Examples of lignin sulfonates produced in this manner are disclosed in U.S. Pat. Nos. 3,956,207 (Blackmore et al.), 3,931,070 (Bond et al.), and 3,597,375 (Ludwig et al.). The other major method of producing lignins for phenolic resins comprises isolating solids from kraft black liquor following kraft pulping techniques, such as disclosed in U.S. Pat. Nos. 4,113,675 (Clarke et al.), 4,306,999 (Adams et al.), and 3,864,291 (Enkvist). The lignins produced in these two ways, however, suffer several drawbacks. For instance, sulfite and kraft lignins contain high levels of sulfate and carbohydrate residues. These residues do not contribute to useful polymer formation and serve only as fillers. Both kraft and sulfite liquors have relatively high amounts of sulfur residues which can generate noxious odors during resin preparation and flakeboard manufacture. Additionally, lignin sulfonates from sulfite liquors and sulfonated kraft liquors are water soluble, and thus contribute to the deterioration of the flakeboard in external applications due to leaching of the adhesive by water.

What is desired is to provide a phenol-formaldehyde resin which employs a lignin to replace a significant portion of the phenol, yet wherein the lignin so employed has low levels of sulfate and carbohydrate residues, has low amounts of sulfur residue, and is insoluble in water. It is further desired that such a resin will be equal or superior to other lignin-phenol-formaldehyde resins in terms of characteristics such as durability and bond strength when used as an adhesive for particulate wood products.

SUMMARY OF THE INVENTION

It has been discovered that a resin formed from an organosolv lignin, phenol, and formaldehyde can be employed as an adhesive for particulate wood products such as flakeboard, and has equal or superior characteristics in terms of bonding strength and durability when compared to prior art resins. In addition, this resin is relatively insoluble in water, and has low levels of sulfate, carbohydrate and sulfur residues. In accordance with the present invention, a method of forming an organosolv lignin-phenol-formaldehyde resin is provided which comprises reacting an aqueous alkaline solution of organosolv lignin with either phenol or formaldehyde to form a reaction product with lignin, then reacting this reaction product with either formaldehyde or phenol, whichever of these two was not used in the first reaction step, to form the organosolv lignin-phenol-formaldehyde resin. The proportion of phenol to lignin in this method can range from about 0.25:1 to about 3:1 by weight, and particularly, preferably about 0.39:1 to 1.88:1. The proportion of formaldehyde to phenol in the method of the invention ranges from about 0.25:1 to about 1.5:1 by weight, preferably about 0.5:1 to 1.03:1.

The organosolv lignin used in the present invention is obtained from a pulping liquor prepared from particulate hardwood material, polar organic solvent or aqueous polar organic solvent, and, optionally, an acid catalyst. It has also been found that resins made from the organosolv lignins obtained from hardwoods unexpectedly have superior qualities over resins made using softwood lignins with regard to use as an adhesive for flakeboard products.

DETAILED DESCRIPTION OF THE PREFERRED EMBODIMENT

The two reaction steps of the method of the invention may be carried out at room temperature but are preferably carried out by heating the reactants at temperatures ranging from about 35° to 100° C. The first reaction step is preferably carried out at a temperature of about 75° to 90° C. for about one half to one and a half hours while the second reaction step is preferably carried out at a temperature of from about 60° to 75° C., also for about one half to one and a half hours.

After the second reaction step, the organosolv lignin-phenol-formaldehyde resin formed can be cooled and the resin recovered and purified. If desired, other special additives can be added to the resin to improve its overall characteristics. For example, urea can be added to reduce the viscosity of the resin.

The aqueous alkaline solution of organosolv lignin employed in the method of the invention may be prepared by combining water, a suitable base, and organosolv lignin, followed by heating to give a homogenous mixture. The amount of water employed is at least that amount sufficient to allow the aqueous lignin solution (in the absence of base) to be stirable (i.e., able to be stirred by common laboratory equipment). This amount of water is typically at least 20% based on the weight of water plus lignin and more typically about 30% to 60%. The amount of base employed is that amount sufficient to allow the reaction of formaldehyde to occur. Such an amount of base will typically result in the reaction mixture having a pH of about 10-14. The heating is preferably conducted at temperatures of from about 30° to 100° C. (with 75° to 90° C. preferred) for a period of about 10 to 60 minutes. It is preferred that an alkali metal hydroxide, such as sodium hydroxide, be used as the base in the aqueous alkaline solution, but other bases, such as sodium carbonate or sodium methoxide can also be employed. When an alkali metal hydroxide is used in the alkaline solution, the proportion of alkali metal hydroxide to phenol employed is preferably about 2:1 to about 7:1 by weight.

The formaldehyde used in the present invention can be in any of the forms commercially available, such as aqueous solutions containing 20% to 50% formaldehyde or paraformaldehyde. A 50% aqueous formaldehyde solution is preferred. When formaldehyde is added to the organosolv lignin solution in the first reaction step, only a fraction of the total formaldehyde charge, preferably around 10% to 20%, should be added. The remaining formaldehyde is then added when the phenol is introduced in the second reaction step.

The phenol employed in the present invention can include not only pure and technical grade phenol, but also phenol with cresol or xylenol impurities. It is preferred that the phenol used have maximum impurity level of about 5%, and preferably a melting range of from about 37° to 40° C. If phenol, rather than formaldehyde, is used in the first reaction step of the present method, then all of the phenol charge may be added to the aqueous alkaline solution of organosolv lignin in which case, a formaldehyde-only charge can be employed in the second reaction step.

The organosolv lignin used in the resin-forming method of the present invention may be obtained by pulping wood from a hardwood tree in a polar organic solvent. The hardwood material is selected from hardwoods such as maple, oak, hickory, poplar and the like and is pulped in particulate form, such as chips, pieces, sawdust, etc. The particulate wood material is preferably debarked and free of extraneous matter such as dirt and leaves. The particulate wood material is first mixed in a polar organic solvent containing an acid catalyst and subjected to heat and pressure so as to form a pulping liquor. In general, the pulping liquor is prepared by adding about 4000 to 5000 grams of wood chips and acid catalyst to about 10 to 11 liters of an aqueous polar organic solvent such as methanol in water and heating the mixture at about 100° to 150° C. with agitation for one to four hours under a pressure of from about 50 to 200 psi.

Polar organic solvents other than methanol suitable for use in the pulping process include other alcohols and glycols such as ethanol, propanol, butanol, 2-ethoxyethanol, and ethylene glycol; organic esters such as ethyl acetate, ethyl propionate, diacetoxyethane, and propyl acetate; ketones such as acetone, methyl propyl ketone, and methyl ethyl ketone; ethers such as dimethoxy ethane and propyl ether and organic acids such as acetic and propionic acids.

Illustrative of acid catalysts that can be used in the pulping process are sulfuric acid, phosphoric acid, hydrochloric acid, organosulfonic acids such as methanesulfonic acid and toluenesulfonic acid, acetic acid, and other carboxylic-type acids. Organic acids such as acetic acid and propionic acid can be used as both the polar organic solvent and acid catalyst.

The polar organic solvent used in the pulping process is preferably admixed with water. The preferred ratio of water to polar organic solvent is between 10:90 and 50:50 by weight with the limiting aspect being the solubility of the organosolv lignin in the total pulping solvent at the temperature the pulping liquors are transferred to a recovery vessel such as a still.

After the pulping liquor is formed, it can be discharged to a holding tank and the remaining hardwood pulp washed with additional amounts of polar organic solvent. The additional solvent is then also transferred to the holding tank. The resulting pulping liquor is then cooled so that the organosolv hardwood lignin can be isolated.

The organosolv lignin can be precipitated from the pulping liquors by mixing a sufficient amount of water to render the lignin insoluble in the pulping solvent. Water can be added to the pulping liquor or vice versa. The amount of water added to the pulping liquor depends upon how much water was used in the pulping operation. However, the preferred final ratio of water to pulping liquor for lignin precipitation is between about 1:1 and 5:1 by weight. Once the lignin has precipitated, it can be recovered by filtration or centrifugation.

The second more preferred method of isolating organosolv lignin is by distillation. In this method the pulping liquor is distilled so as to decrease the concentration of the polar organic solvent to where the organosolv lignin precipitates from the liquor. The first step of this method is to adjust the acidity of the pulping liquor to a pH of about 4–6 by adding a base such as sodium hydroxide, sodium acetate, sodium carbonate, and the like. The polar organic solvent is then distilled out of the pulping liquor until the organosolv lignin precipitates. The distillation is preferably conducted under partial vacuum until nearly 80% of the organic solvent has been recovered. During the distillation, water is added to the pulping liquor residue to replace approximately 50% of the organic solvent removed on a volume basis. Upon completion of the distillation, the aqueous lignin slurry is cooled to room temperature, and the lignin is recovered by filtration or other conventional separation means.

pH adjustment and minimizing exposure of the organosolv lignin to high temperature by distilling at reduced pressure decreases self-condensation and minimizes molecular weight build-up. It is important to minimize self-condensation so that the maximum number of reactive sites of the lignin are available for reaction during resin preparation and resin cure.

The lignin obtained in either method is washed with water and dried, preferably at a temperature of about 50° to 60° C. for 24 to 72 hours in a forced air oven or vacuum oven.

The dried lignin cake produced by the above process can optionally be further purified by several methods known in the art. However, it is preferred that the dried organosolv lignin be slurried in an aqueous sodium bicarbonate solution (10% preferred) at a temperature of from about 40° to 80° C. (60° preferred) for about one half to two hours (preferably about 1 hour). The slurry is then cooled to room temperature, and the purified organosolv lignin can be recovered by filtration. The filter cake is washed with water until the filtrate pH becomes less than 7.5, and then the cake is dried such as by a forced air oven at around 50° to 55° C.

Analyses of the organosolv lignin obtained from hardwoods as described above, show a predominance of syringyl over guaiacyl groups, as would be expected for hardwoods, and a final softening point of about 111° C. The syringyl/guaiacyl ratio (syr/gua) is typically $>1$ and more typically $>1.25$, depending on the type of hardwood source. In addition, organosolv lignin obtained as described herein typically has an ash content <3 weight %, preferably <2 weight %, and a sulfur content of <1 weight %, preferably <0.25 weight %, and for pure organosolv lignin, most preferably <0.1 weight %. In comparisons with purified kraft lignin, the organosolv lignin of the present invention (both crude and purified) contained must less sulfur and ash than purified kraft lignin. The organosolv lignin is soluble in alcohols, such as methanol, ketones, and low molecular weight organic acids such as acetic acid. Kraft lignin, in contrast, is characterized by a higher guaiacyl to syringyl ratio, as would be expected for softwoods, and a higher final softening temperature than the organosolv lignin, and less solubility in polar organic solvents.

Resins prepared from organosolv hardwood lignin, phenol and formaldehyde in accordance with the method of the present invention are characterized generally as having a Brookfield viscosity at 25° C. of from about 150 to 450 centipoise, a free formaldehyde content of from about 0.1% to 0.75% by weight, a free phenol content of from about 0 to 250 parts per million (ppm), and a non-volatile solids content of from about 40% to 70% by weight. In addition, the gel time of the resins of the present invention at 100° C. (as determined using a Sunshine gel testing device) is from about 15 to 35 minutes. The resins of the present invention will typically have 35% less phenol than commercial resins used in the manufacture of flakeboards, and up to about 40% of the phenol can be replaced with the organosolv hardwood lignin prepared as described above without detrimentally affecting adhesive properties.

A glue-block screening test was undertaken to evaluate the performance of the organosolv lignin-phenol-formaldehyde resins of the present invention as an adhesive in flakeboard panels. In the test, maple glue blocks were glued together using resins of varying organosolv lignin ratios, as well as resins prepared from kraft softwood-based lignin, and a commercial Borden control resin. It was unexpectedly observed that the resins of the present invention outperformed both the commercial Borden control and the purified kraft lignin based phenol-formaldehyde resins at about the 35% and 40% solids replacement level. In addition, up to about 40% of the phenol resin solids could be replaced with organosolv lignin without detrimentally affecting adhesive properties. Not only was the organosolv lignin more desirable than kraft lignin in terms of dry and wet strengths for the adhesive bond, but the kraft lignins produced sulfur-like odors during resin preparation and hot-pressing, a problem not present when organosolv lignins were used.

The superiority of the organosolv hardwood lignin-based resins over the purified kraft softwood lignin-based resin is surprising in light of the expected reactivity of the two lignins when used in phenol-formaldehyde resin adhesives. It would have been expected that hardwood lignins would be inferior to softwood lignins in regard to adhesion because the softwoods generally have more available reactive positions on the aromatic nuclei, and thus should be able to form a more highly crosslinked polymer network with enhanced adhesive properties. However, it was found that the adhesive properties of organosolv hardwood lignin-based resin were found to be superior to those of a kraft softwood lignin-based resin containing commercially purified kraft lignin. While it is not clear why this is the case, it is possible that the decreased concentration of monofunctional lignin-like materials that occurs during the purification of the crude organosolv lignin aids in ultimate polymer formation. These monofunctional materials will normally react with formaldehyde, but do not lead to productive polymer network formation. They serve only as chain-stoppers and interfere with formation of the phenol-formaldehyde crosslinked network, resulting in weakened bond strength. Mass spectral data has shown that predominately monofunctional lignin-like materials are removed when the crude organosolv lignin is purified through extraction with aqueous sodium bicarbonate solution. It is thus likely that the removal of the monofunctional materials is in large part responsible for the superior adhesive qualities of the resins produced in accordance with the present invention. In any event, the resins of the present invention have been shown to be excellent adhesives, have low levels of sulfur and ash residues, and can cut down significantly on the amount of phenols used in the bonding of particulate wood products.

The following examples are provided as illustrative of the present invention and are not intended to limit its scope in any way:

EXAMPLE 1

Preparation and Purification of Organosolv Hardwood Lignins (a) Wood Pulping

Clean debarked red oak wood chips, aqueous polar organic solvent (70% by weight methanol in water), and acid catalyst (10% sulfuric acid) were charged to an inerted, agitated autoclave connected to a holding tank. The reactor was sealed, pressurized to 100 psi with nitrogen, and rapidly heated to a temperature around 120° to 150° C. with agitation. When the lignin content of the pulp became less than 50 kappa units after a several hour hold period at 120° to 150° C., the pulping liquors were discharged to the holding tank. The pulp was washed with more aqueous polar organic solvent and this too was transferred under pressure to the holding tank. The pulp was water-slurried, cooled, and discharged from the reactor. The pulping liquor was likewise cooled and discharged from the holding tank.

(b) Organosolv Lignin Isolation

The pH of the pulping liquor was adjusted to about 5.0 by the addition of aqueous sodium hydroxide then the pulping liquor was distilled under vacuum until nearly 80% of the polar organic solvent had been recovered. During the distillation, water was added to the pulping liquor residue to replace approximately 50% of the polar organic solvent removed on a volume basis. During the distillation, lignin began to precipitate. Upon completion of the distillation, the aqueous lignin slurry was cooled to room temperature and filtered. The lignin filter cake was washed with water and pulled down well on the filter. The filtrate contained mostly hemicellulose sugars and very little isolable lignin. The lignin filter cake was dried in a 50° to 55° C. forced-air oven for 48 hours.

(c) Purification

Dried organosolv lignin was slurried in a 10% aqueous sodium bicarbonate solution at 60° C. for 1 hour. The slurry was cooled to room temperature and filtered. The filter cake was washed with water until the filtrate pH became less than 7.5. The filter cake was dried in a forced-air oven at 50° to 55° C. The yield was 90% to 95%.

The crude and purified organosolv lignins as prepared above were both analyzed in many different aspects. The results are presented in Tables 1a through 1c. These tables also include data from tests of a kraft softwood lignin (known as "Indulin AT," a trademark of WESTVACO) for comparison.

TABLE 1a

| Analytical Test | Organosolv Lignin-Crude | Organosolv Lignin-Purified | Indulin AT Kraft Lignin |
|---|---|---|---|
| % Nonvolatiles (50° C. vac. oven 48 hrs.) | 97% | 97% | 97% |
| Ash, 775° C. | 1.94% | 1.13% | 3.48% |
| Carbohydrates (Extraction-HPLC) | 3.0% | 1.1% | 0.7% |
| Combustion | | | |
| C | 59.85% | 60.94% | 61.99% |
| H | 5.87% | 5.63% | 5.65% |
| N | 0.27% | Trace | 0.52% |
| S | 0.24% | 0.04% | 1.68% |
| Na | 4900 ppm | 1100 ppm | 10,100 ppm |
| K | 350 ppm | 113 ppm | 890 ppm |
| Ca | 152 ppm | 171 ppm | 148 ppm |
| $T_{softening-initial}$ (Thermomechanical analysis) | 89° C. | 124° C. | 128° C. |
| $T_{softening-final}$ (Thermomechanical analysis) | 111° C. | 138° C. | 169° C. |

TABLE 1b

| Analytical Test | Organosolv Lignin-Crude | Indulin AT Kraft Lignin |
|---|---|---|
| Extraction | | |
| Ether, reflux | 6% (wt. loss) | 3% (wt. loss) |
| Heptane, reflux | 1% | 1% |
| Methylene chloride, reflux | 50% | 11% |
| Water, 25° C. | 5% | 2% |
| Water, 60° C. | 12% | 6% |
| Water, 100° C. | 5%* | 3%* |
| Solubility (25° C.) | | |
| Methanol | 105 g/l | |
| Ethanol | 53 | |
| n-Propanol | 35 | |
| 2-Propanol | 15 | |
| Acetic Acid | 108 | |
| Acetone | 104 | |
| 2-Butanone | 96 | |
| Acetonitrile | 86 | |
| Ethyl Acetate | 59 | |

*Sample agglomerates severely.

TABLE 1c

| NMR Analysis | Organosolv Lignin-Crude | Indulin AT Kraft Lignin |
|---|---|---|
| % OCH$_3$ | 22.04% | 13.70% |
| Syr/gua Per C$_9$ Unit | 1.33 | 1 |
| OH (Phenolic) | 0.60 | 0.59 |
| OH (Aliphatic) | 0.55 | 0.72 |
| H (Total) | 6.78 | 8.10 |
| H (Aromatic) | 1.93 | 2.51 |
| H (Aliphatic) | 3.65 | 4.28 |
| H (Hydroxyl) | 1.20 | 1.36 |

EXAMPLES 2 AND 3

Preparation of Organosolv Hardwood Lignin Resin

EXAMPLE 2

Two hundred eighty-eight grams (288 grams) of water, 143 grams of 50% aqueous sodium hydroxide solution and 390 grams of organosolv lignin were combined in an agitated resin pot. The mixture was heated to 75° C. and 281 grams of 50% aqueous formaldehyde solution was added. The temperature was held at 75° C. for 90 minutes. One hundred forty-four grams (144 grams) of water and 1,000 grams of phenol were added. The temperature was adjusted to 60° C. Next, 328 grams of 50% aqueous sodium hydroxide solution was added while maintaining the temperature at 60° C. Finally, 1,527 grams of 50% aqueous formaldehyde was added over a 1-hour period. The temperature was allowed to rise to 70° C. and was held there for 30 minutes. The solution was cooled to 25° C., and 162 grams of urea was added to control viscosity. The resulting resin was collected and analyzed, and the following physical properties were observed:

55% nonvolatiles
440 cp viscosity (Brookfield, 25° C.)
10.2 pH
0.67% free formaldehyde
100 ppm free phenol

EXAMPLE 3

Combined in an agitated resin pot were 63 g of water, 55 g of organosolv lignin (OSL), and 53 g of phenol. These were heated at 90° C. for one hour, then cooled rapidly to 45° C. with an ice bath. Added were 39.8 g of para-formaldehyde, 45 g of water, and 21 g of 50% aqueous sodium hydroxide solution. The mixture was heated at 65° C. for one hour. Three grams (3 g) of melamine were added to control the viscosity and scavenge excess formaldehyde. The mixture was then cooled to room temperature.

The resin produced in the above example was analyzed, and the following properties were observed:

57% nonvolatiles 180 cp viscosity (Brookfield, 25° C.) 10.3 pH 0.71% free formaldehyde 100 ppm free phenol Typical resin with 35% of the phenol replaced by OSL would be characterized by the following data:

| | |
|---|---|
| Nonvolatile solids | 52%–57% |
| Viscosity (Brookfield) | 150–450 cp (25° C.) |
| pH | 10.1–11.0 |
| Gel time at 100° C. | 19–26 minutes |
| Free formaldehyde | 0.25%–0.75% |
| Free phenol | 50–250 ppm |
| Storage stability at 25° C. to reach 2,000 cp viscosity | 10–14 days |

| | Mole Ratios | |
|---|---|---|
| Reactant | Range Investigated | Range Preferred |
| Phenol | 1 | 1 |
| Formaldehyde | 1.6–3.24 | 1.8–3.0 |
| OSL[1] | 0.25–1.20 | 0.25–0.8 |
| NaOH | 0.34–1.30 | 0.4–0.65 |

[1]Assume mol wt. to be 200 per C$_9$ unit.

EXAMPLE 4

Glue-Block Screening Tests

In order to test adhesive strength sugar maple (*Acer saccharum*) blocks 3 inches long, 1 inch wide, and ¼ inch thick where glued together with resins of the present invention (at different levels of % organosolv lignin), resins made using kraft softwood lignins, and control resins. The maple glue blocks were used at 6% moisture, and the formula 0.006 g/cm$^{-2}$ resin solids was used to calculate the amount of resin used in each application. The resin was applied by a disposable pipet, and the blocks were then clamped together using a C-clamp. The prepress wetting times were 0 and 10 minutes. The blocks were placed in a hot press after the C-clamp was removed, and press temperatures of 177° C., 165° C. and 155° C. (10 sample blocks at each setting) were used. The blocks were clamped in the press for 4–6 minutes under pressures of 500–1,000 psi. All bonded samples were left to cool and cure for at least 24 hours at ambient temperature and humidity. After bonding, all wooden glue blocks were stored at ambient temperature and humidity for a 24-hour period prior to a lap shear testing.

Bond strength for the blocks as prepared above was tested by measuring lap shear strength on an Instron machine. Both wet and dry lap shear strength tests were performed. The dry test preparation only required the 24-hour curing period prior to lap shear testing. Wet strength testing consisted of boiling the bonded wooden glue blocks in water for four hours. The bond strengths were immediately measured while the blocks were still wet. A set of 10 bonded wooden glue blocks was tested for each resin. The results of the bonding strength tests are observed in Table 2a. An analysis of the glue blocks used in the tests is presented in Table 2b.

The glue-block screening tests indicated that:

(a) The OSL resins of the present invention outperformed the commercial Borden control and kraft lignin-based phenol-formaldehyde resins, particularly at a solids replacement level of about 35% and 40%.

(b) Up to about 40% of the phenol-formaldehyde resin solids could be replaced with organosolv lignin without detrimentally affecting adhesive properties.

(c) Purified OSL resins generally performed better than unpurified OSL resins. It would thus appear that the aqueous sodium bicarbonate reslurry procedure on the organosolv lignin improves its use as a phenol-formaldehyde resin extender.

TABLE 2a

Glue-Block Test Results

| Resin | % Lignin | Dry Strength | % Bond Failure | Wet Strength | % Bond Failure | % Strength Retention |
|---|---|---|---|---|---|---|
| I(Cascophen PC-16 by Borden) | — | 741 ± 121 psi | 20% | 447 ± 59 psi | 100% | 60% |
| II | 25% | 724 ± 153 | 0% | 369 ± 100 | 70% | 57% |
| III | 34% | 919 ± 143 | 20% | 571 ± 114 | 40% | 62% |
| IV | 34% | 927 ± 138 | 10% | 474 ± 168 | 40% | 51% |
| V | 34% | 776 ± 103 | 0% | 439 ± 50 | 60% | 57% |
| VII | 34% | 616 ± 41 | 10% | 266 ± 24 | 100% | 43% |
| VII | 40% | 550 ± 171 | 70% | 390 ± 114 | 80% | 62% |
| VIII | 40% | 888 ± 102 | 30% | 396 ± 107 | 90% | 45% |
| IX | 40% | 812 ± 101 | 40% | 489 ± 99 | 70% | 60% |
| X | 40% | 788 ± 169 | 40% | 295 ± 90 | 100% | 37% |
| XII | 40% | 600 ± 106 | 40% | 275 ± 115 | 90% | 46% |
| XII | 45% | 555 ± 119 | 40% | 306 ± 81 | 90% | 55% |
| XIII | 45% | 389 ± 125 | 80% | 145 ± 101 | 100% | 37% |
| XIV | 45% | 417 ± 181 | 100% | 0 | 100% | — |

[1] Made from Indulin AT Kraft Lignin from WESTVACO.

TABLE 2b

Resin Description

| Res-in | % Lignin | Mole Ratio of Components | | | | Comments |
|---|---|---|---|---|---|---|
| | | Phenol | Formaldehyde | Lignin[1] | NaOH | |
| I | — | — | — | — | — | Control Resin |
| II | 25% | 1.00 | 2.03 | 0.38 | 0.47 | 1% Melamine Added |
| III | 34% | 1.00 | 2.95 | 0.53 | 0.47 | 1% Melamine Added |
| IV | 34% | 1.00 | 2.42 | 0.44 | 0.46 | 1% Melamine Added |
| V | 34% | 1.00 | 2.42 | 0.49 | 0.46 | Lignin Extracted With CHCl$_2$ |
| VI | 34% | 1.00 | 2.33 | 0.49 | 0.46 | Indulin AT Kraft Lignin |
| VII | 40% | 1.00 | 2.97 | 0.68 | 0.49 | Lignin Washed With Hot Water |
| VIII | 40% | 1.00 | 2.97 | 0.68 | 0.50 | — |
| IX | 40% | 1.00 | 2.97 | 0.67 | 0.50 | Lignin Reslurred in Aqueous 10% NaHCO$_3$ Solution |
| X | 40% | 1.00 | 2.95 | 0.68 | 0.53 | 1% Melamine Added |
| XI | 40% | 1.00 | 2.97 | 0.67 | 0.52 | Indulin AT Kraft Lignin |
| XII | 45% | 1.00 | 3.83 | 0.84 | 0.47 | Lignin Reslurred in Aqueous 10% NCHCO$_3$ Solution |
| XIII | 45% | 1.00 | 2.77 | 0.84 | 0.61 | 1% Melamine Added |
| XIV | 45% | 1.00 | 3.22 | 0.84 | 0.47 | — |

[1] Molecular Weight of Lignin Assumed to be 200.

What is claimed is:

1. A method for forming an organosolv lignin-phenol-formaldehyde resin comprising:
   (a) mixing particulate wood material, polar organic solvent, and an acid catalyst under heat and pressure to form a pulping liquor;
   (b) reducing the concentration of the polar organic solvent in the pulping liquor so that an organosolv lignin precipitates from the pulping liquor and is recovered;
   (c) reacting an aqueous alkaline solution of said organosolv lignin with either phenol or formaldehyde to form a reaction product of lignin and either phenol or formaldehyde; and (d) then reacting the reaction product thus formed with either formaldehyde or phenol, whichever of these two was not used in reaction step (c), to form the organosolv lignin-phenol formaldehyde resin, wherein the proportion of phenol to lignin in the reaction is from about 0.25:1 to about 3:1 by weight, and the proportion of the formaldehyde to phenol in the reaction is from about 0.25:1 to about 1.5:1 by weight.

2. The method according to claim 1 wherein the formaldehyde is present in the form of paraformaldehyde.

3. The method according to claim 1 wherein step (c) is carried out at a temperature from about 35° C. to about 100° C.

4. The method according to claim 1 wherein step (d) is carried out at a temperature from about 35° C. to about 100° C.

5. The method according to claim 1 wherein the aqueous alkaline solution contains an alkali metal hydroxide.

6. The method according to claim 5 wherein the proportion of alkali metal hydroxide to phenol in the reaction is from about 2:1 to about 7:1 by weight.

7. The method according to claim 1 wherein the polar organic solvent comprises methanol.

8. The method according to claim 1 wherein the organosolv lignin is obtained from a hardwood material.

9. The method according to claim 8 wherein the hardwood material is selected from the group consisting of maple, oak, hickory, and poplar.

10. The method according to claim 1 wherein the concentration of the polar organic solvent in step (b) is reduced by distillation.

11. The method according to claim 1 wherein the organosolv lignin recovered from the pulping liquor is purified.

12. The method according to claim 1 wherein said polar organic solvent is selected from the group consisting of aqueous polar organic solvents, alcohols, organic esters, ketones, and organic acids.

13. A method for forming an organosolv lignin-phenol-formaldehyde resin comprising:

(a) mixing particulate wood material, organic solvent, and an acid catalyst under heat and pressure to form a pulping liquor;

(b) reducing the concentration of the polar organic solvent in the pulping liquor so that an organosolv lignin precipitates from the pulping liquor and is recovered;

(c) purifying the organosolv lignin by drying the lignin, slurring the dried lignin in an aqueous sodium bicarbonate solution at a temperature from about 40° to 80° C. for about ½ to 2 hours, cooling the slurry and recovering the purified organosolv lignin;

(d) reacting an aqueous alkaline solution of said organosolv lignin with either phenol or formaldehyde to form a reaction product of lignin and either phenol or formaldehyde; and (e) then reacting the reaction product thus formed with either formaldehyde or phenol, whichever of these two was not used in reaction step (d) to form the organosolv lignin-phenol formaldehyde resin, wherein the proportion of phenol to lignin in the reaction is from about 0.25:1 to about 3:1 by weight, and the proportion of the formaldehyde to phenol in the reaction is from about 0.25:1 to about 1.5:1 by weight.

14. A method for forming an organosolv-lignin-phenol-resin comprising:

(a) heating a mixture of particulate wood material, polar organic solvent, and an acid catalyst at about 100° to 150° C. for about 1 to 4 hours at about 50 to 200 psi to form a pulping liquor;

(b) reducing the concentration of the polar organic solvent in the pulping liquor so that an organosolv lignin precipitates from the pulping liquor and is recovered;

(c) reacting an aqueous alkaline solution of said organosolv lignin with either phenol or formaldehyde to form a reaction product of lignin and either phenol or formaldehyde; and (d) then reacting the reaction product thus formed with either formaldehyde or phenol, whichever of these two was not used in reaction step (c), to form the organosolv lignin-phenol formaldehyde resin, wherein the proportion of phenol to lignin in the reaction is from about 0.25:1 to about 3:1 by weight, and the proportion of the formaldehyde to phenol in the reaction is from about 0.25:1 to about 1.5:1 by weight.

* * * * *